United States Patent [19]

Small

[11] 4,155,518
[45] May 22, 1979

[54] REEL LIFTING APPARATUS

[75] Inventor: Robert F. Small, San Jose, Calif.

[73] Assignee: General Cable Corporation, San Carlos, Calif.

[21] Appl. No.: 872,479

[22] Filed: Jan. 26, 1978

[51] Int. Cl.² .................. B65H 75/40; B60P 1/48
[52] U.S. Cl. ........................... 242/86.5 R; 414/406
[58] Field of Search ............ 242/86.5 R, 86.52, 94, 242/54 R; 214/77 R, 501, 502, 504

[56] References Cited

U.S. PATENT DOCUMENTS

| 2,867,390 | 1/1959 | Anrig | 242/86.5 R |
| 3,036,790 | 5/1962 | Rheinberger | 242/86.5 R |
| 3,820,673 | 6/1974 | McVaugh | 214/77 R |
| 3,902,612 | 9/1975 | Hall | 242/86.5 R X |
| 4,044,963 | 8/1977 | Hostetler | 242/86.5 R |

Primary Examiner—Edward J. McCarthy
Attorney, Agent, or Firm—Flehr, Hohbach, Test, Albritton & Herbert

[57] ABSTRACT

Reel lifting apparatus utilizing a truck-like vehicle having a wheeled framework with a subframe mounted on the framework. A truck bed body is mounted upon the subframe and overlies the subframe. An elongate rod-like member is provided which is pivotally mounted on the body so that it extends in a direction at right angles to the longitudinal axis of the vehicle. First and second arms are mounted in fixed spaced apart positions on the rod-like member. The arms are formed so that they are capable of carrying a reel mounted upon a spindle. A plate is secured to the rod-like member. An L-shaped member has one end of the same pivotally connected to the subframe and the other end pivotally connected to the plate. An actuator is pivotaly connected to the subframe and to the L-shaped member at a point intermediate the ends of the L-shaped member for causing the movement of the arms through an angle in excess of 135°. An in-line motor drive train is mounted upon one of the arms. Means is provided for connecting the drive train to the reel so that the reel can be driven.

14 Claims, 11 Drawing Figures

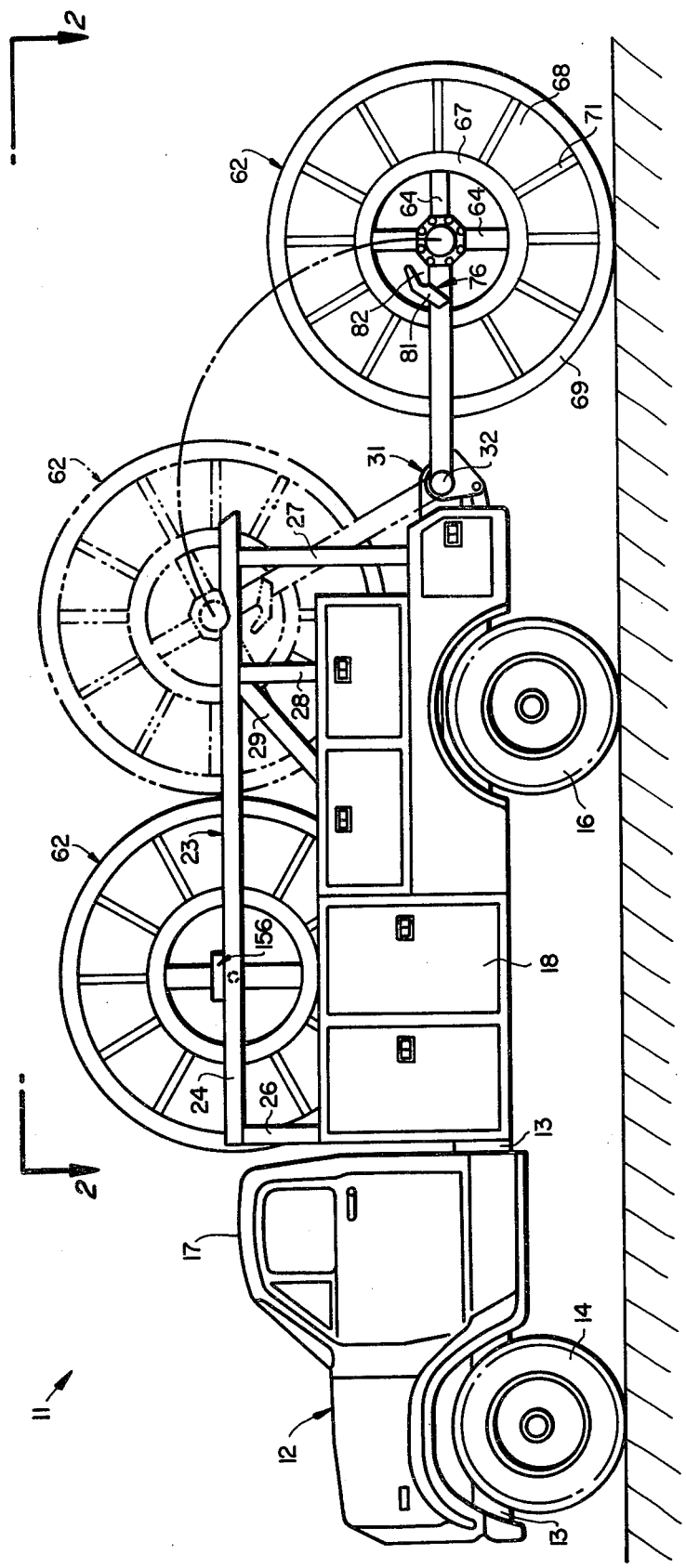
FIG_1

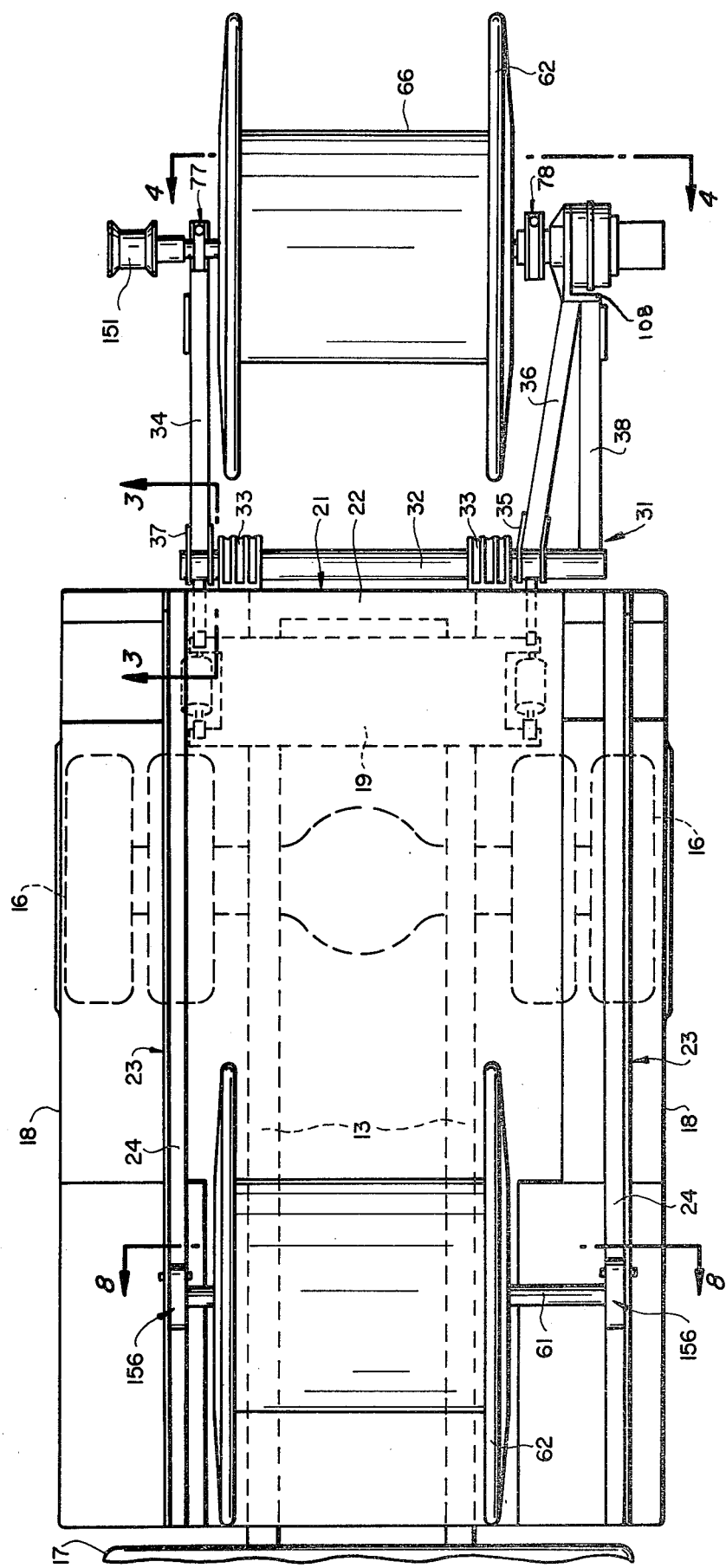

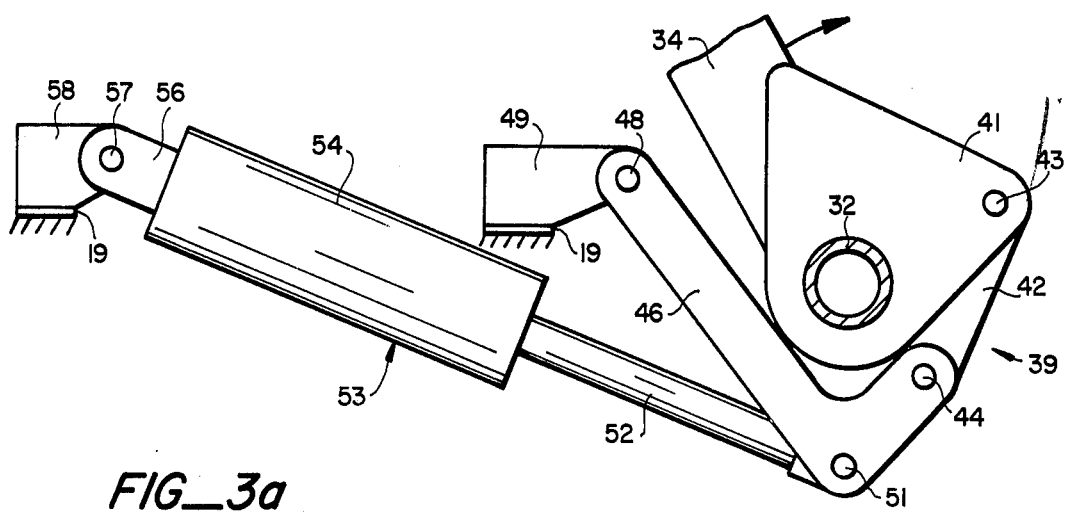
FIG_3a
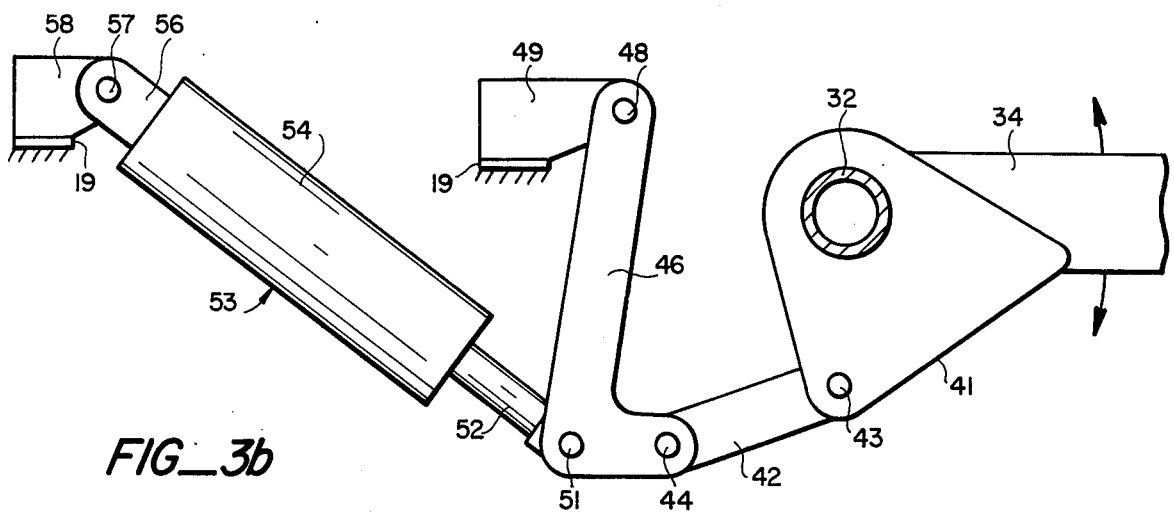
FIG_3b
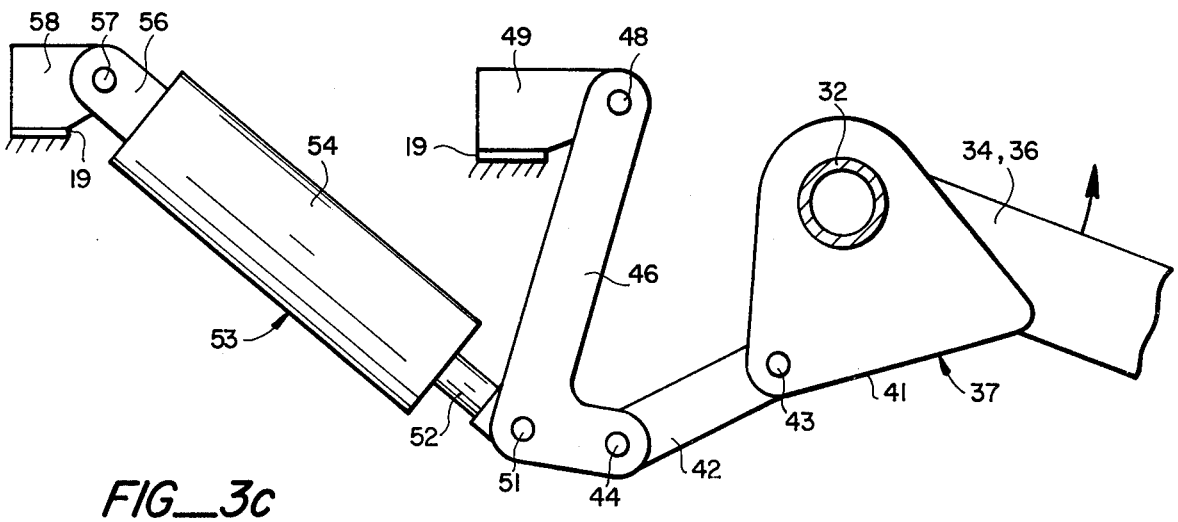
FIG_3c

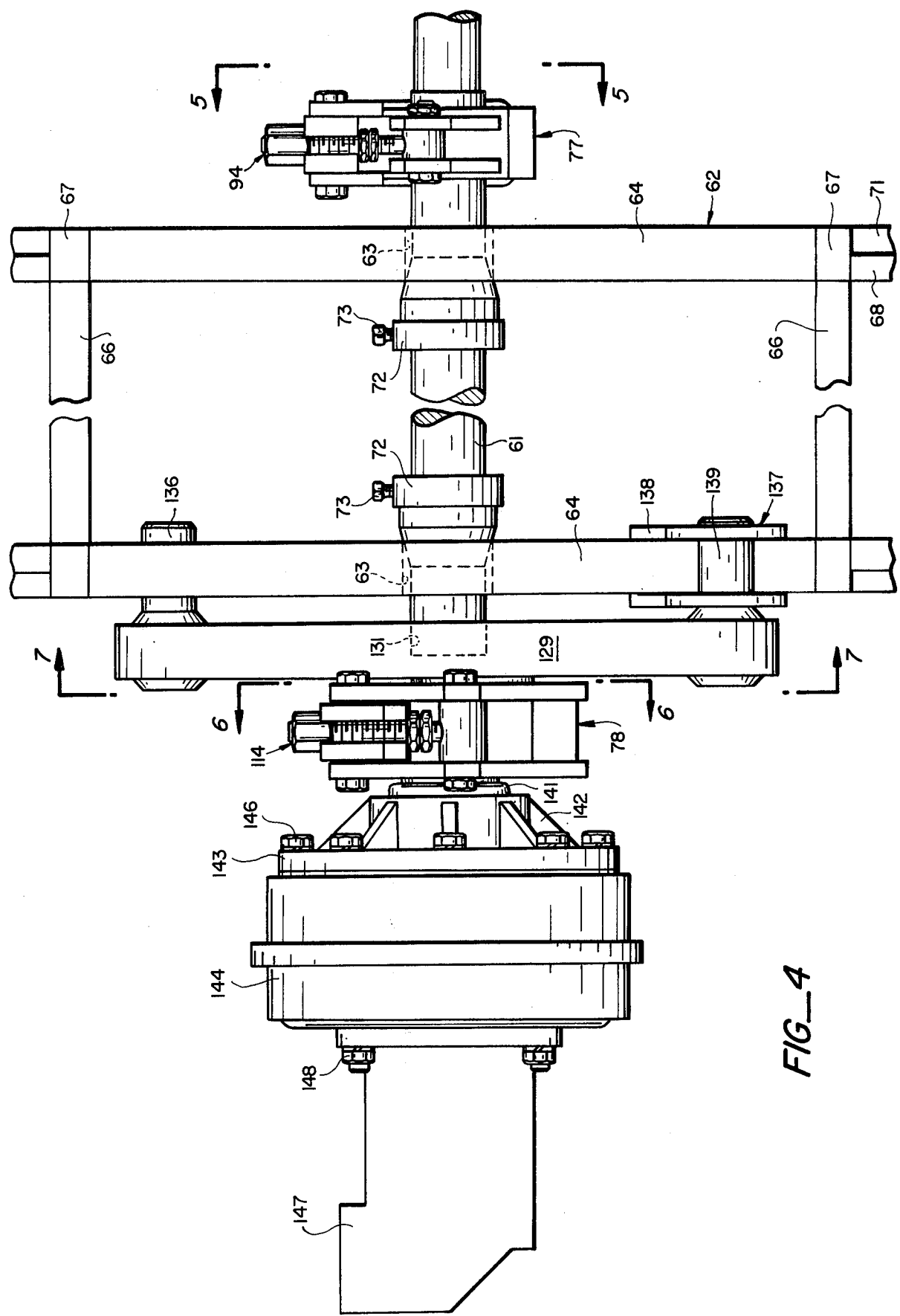
FIG_4

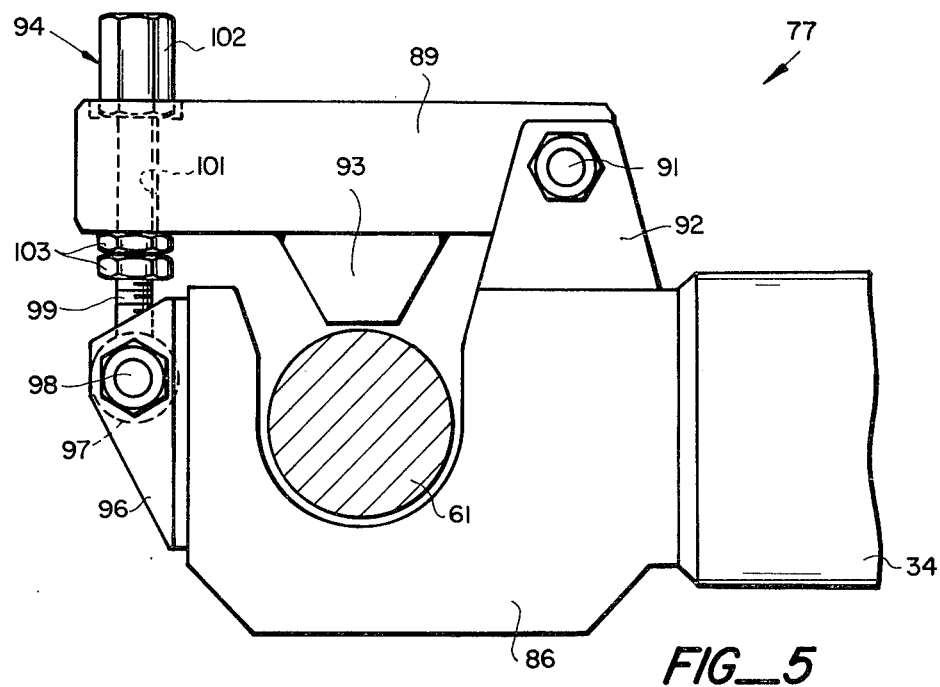
FIG_5
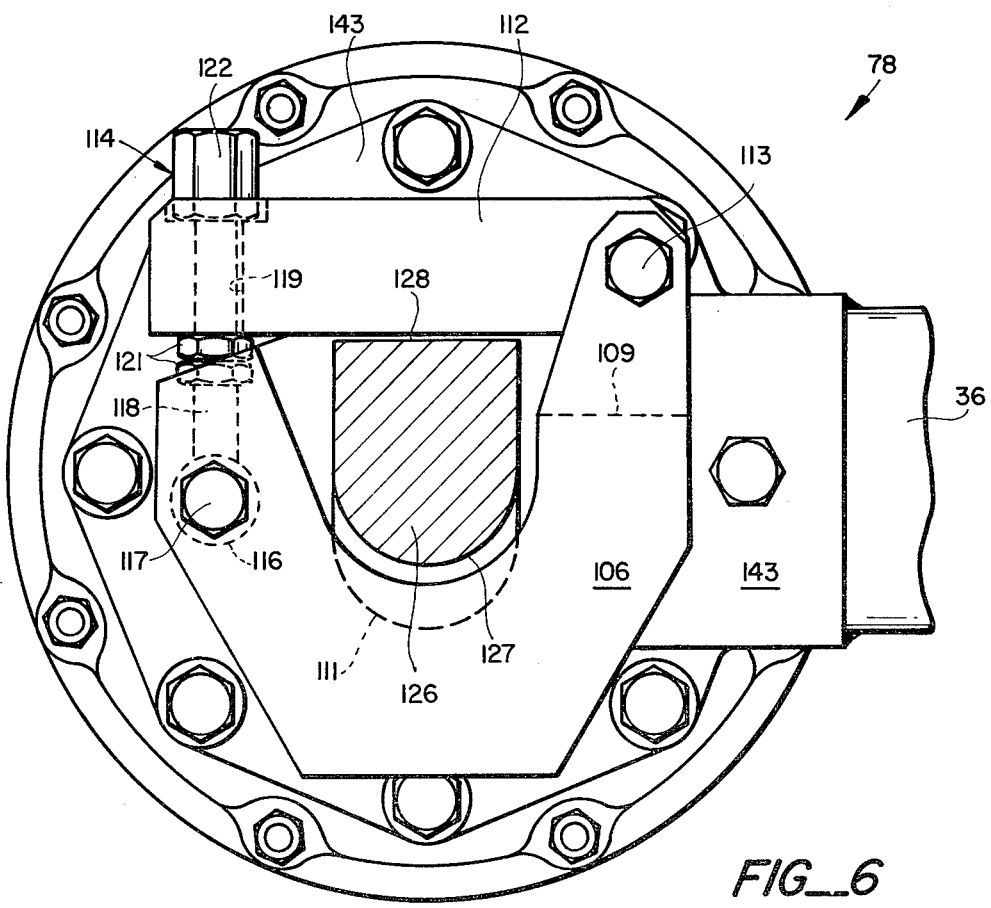
FIG_6

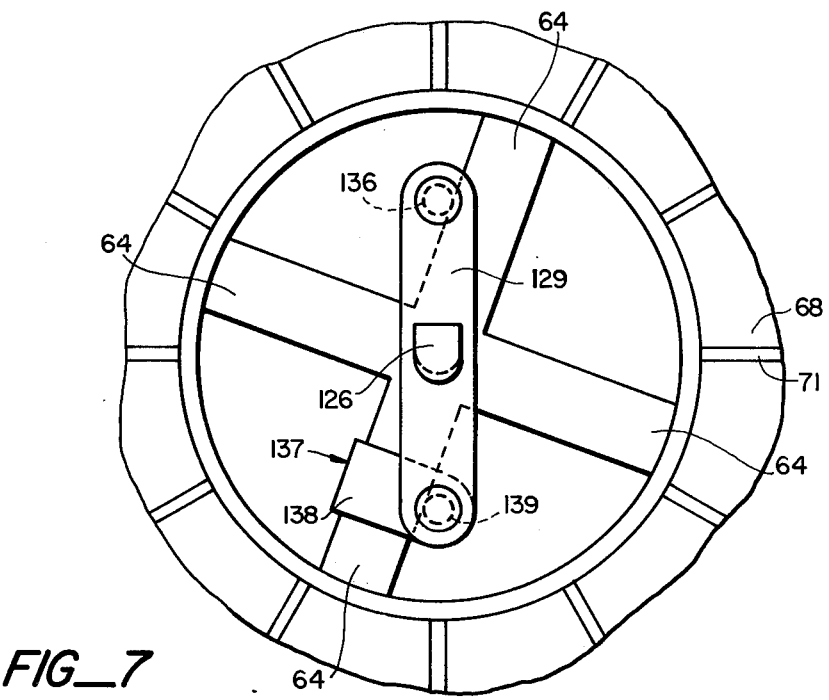
FIG_7
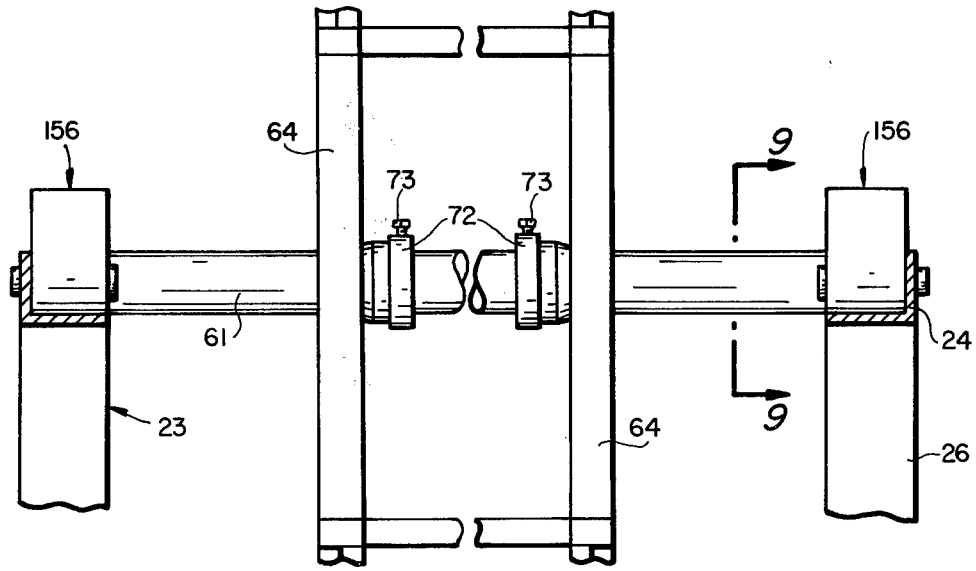
FIG_8
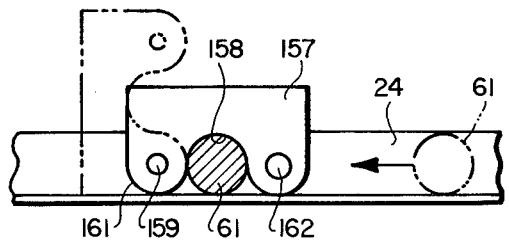
FIG_9

REEL LIFTING APPARATUS

BACKGROUND OF THE INVENTION

Various types of reel lifting devices have heretofore been provided. Certain such reel lifting devices have utilized rubber rollers for driving the outer edges of the rims of the reels. Apparatus of this type has a disadvantage in that only certain types of reels can be driven. In addition in such apparatus, the payload of the vehicle is so far to the rear that it creates an unbalanced situation on the vehicle. In addition, the rollers used for driving the reels have a tendency to disintegrate. The mechanism utilized for driving the rollers is relatively complicated and service life on the mechanism is relatively poor. Other apparatus has utilized a spindle bar in the reel and have provided means for engaging the spindle bar for driving the reel. Such mechanisms have been relatively complicated and also have limited application to the different types of reels. Another type of apparatus utilized a chain-type drive for the spindle which was utilized for driving the reel. Such apparatus has had the disadvantage in that it is incapable of carrying heavy reels and, in addition, it has been difficult to remove the spindle bar. There is, therefore, need for a new and improved reel lifting apparatus which overcomes the above named disadvantages.

SUMMARY OF THE INVENTION AND OBJECTS

The reel lifting apparatus consists of a truck-like vehicle having a wheeled framework. A subframe is mounted on the framework. A truck bed body is mounted upon the subframe and overlies the subframe. The truck bed body has a planar surface. An elongate rod-like member is pivotally mounted on the body so it extends in a direction at right angles to the longitudinal axis of the vehicle. First and second arms are mounted in spaced apart fixed positions on the rod-like member. Means is carried by the end of the arms for receiving and carrying the reel. A plate is secured to the rod-like member. An L-shaped member is provided. Means is provided for pivotally securing one end of the L-shaped member to the subframe. Means is provided for connecting the other end of the L-shaped member to the plate at a point offset from the axis of rotation of the rod-like member. An actuator is provided which underlies the truck body and has one end of the same pivotally connected to the subframe and has the other end of the same pivotally connected to the L-shaped member at a point between the ends of the L-shaped member whereby there is imparted to the rod-like member and the arms carried thereby rotational movement in excess of 135°. A spindle bar is adapted to be inserted through the reel and is removably mounted in the ends of said arms. A motor is carried by one of the arms. Means is provided for coupling the output shaft of the motor to the spindle bar to cause rotation of the spindle bar and the reel carried thereby.

In general, it is an object of the present invention to provide a reel lifting apparatus mounted on a vehicle which can accommodate various types of reels.

Another object of the invention is to provide a reel lifting apparatus of the above character in which relatively heavy reels can be carried in the reel lifting apparatus.

Another object of the invention is to provide a reel lifting apparatus in which large, heavy reels can be carried without the necessity of storing the same in a separate vehicle.

Another object of the invention is to provide a reel lifting apparatus of the above character which can generate a large line pull.

Another object of the invention is to provide a reel lifting apparatus in which the weight of the reel carried thereby is sufficiently far forward that the vehicle remains stable.

Another object of the invention is to provide a reel lifting apparatus which is relatively simple to build and operate.

Additional objects and features of the invention will appear from the following description in which the preferred embodiment is set forth in detail in conjunction with the accompanying drawings.

DESCRIPTION OF THE DRAWINGS

FIG. 1 is a side elevational view of a reel lifting apparatus incorporating the present invention.

FIG. 2 is a top plan view looking along the line 2—2 of FIG. 1.

FIGS. 3a, 3b and 3c are cross-sectional views taken along the lines 3—3 of FIG. 2 and show various positions for the reel lifting apparatus.

FIG. 4 is a cross-sectional view taken along the line 4—4 of FIG. 2.

FIG. 5 is a cross-sectional view taken along the line 5—5 of FIG. 4.

FIG. 6 is a cross-sectional view taken along line 6—6 of FIG. 4.

FIG. 7 is a cross-sectional view taken along the line 7—7 of FIG. 4.

FIG. 8 is a cross-sectional view taken along the line 8—8 of FIG. 2.

FIG. 9 is a cross-sectional view taken along the line 9—9 of FIG. 8.

DESCRIPTION OF THE PREFERRED EMBODIMENT

The reel lifting apparatus 11 consists of a truck-like vehicle 12 of a conventional type. The truck or truck-like vehicle is provided with a framework 13 having front and rear wheels 14 and 16 mounted thereon. A cab 17 of a conventional type is mounted over the forward extremity of the framework. First and second rows of spaced apart parallel rows of cabinets 18 are mounted on opposite sides of the framework 13 to the rear of the cab 17. A subframe 19 is mounted upon the framework 13 and serves to reinforce the framework. A truck bed body 21 is mounted upon the subframe 19 and overlies the subframe 19. The truck bed body 21 is provided with a planar bed 22 overlying the subframe 19.

A reel support or carrying frame 23 is mounted upon the framework 13 and upon the subframe 19 and is provided on each side of the framework 13. The frame 23 consists of a horizontal angle member 24 which is supported in its forward extremity by a vertical post 26 and its rear extremity by a vertical post 27. Another vertical post 28 is provided intermediate posts 26 and 27. A brace 29 is secured to the post 28.

A reel lifting equipment 31 is mounted on the rear extremity of the truck-like vehicle 12. The lifting equipment 31 consists of a large rod or shaft-like member in the form of a 4-inch steel pipe 32. Means is provided for pivotally mounting the rod-like member 32 so that it extends in a direction at right angles to the longitudinal axis of the truck-like vehicle. As shown in the drawings, such means consists of a pair of pivot bearing assemblies 33 which are mounted in spaced apart positions on the rear wall of the truck bed body 21 as shown particularly in FIG. 2. First and second spaced apart arms 34 and 36 are provided and have their rearmost extremities mounted in fixed positions on the rod-like member 32 for pivotal movement on the axis of rotation of the member 32. The arms 34 and 36 are fixed to the rod-like member 32 by brackets 37 and 35 respectively. An additional support arm 38 is mounted in a fixed position on the member 32 and is associated with the arm 36. The arm 38 has one end fixed to the rod-like member 32 by suitable means such as welding. The two arms 36 and 38 are provided on one side to provide an additional support for drive means as hereinafter described.

Means is provided for causing rotational movement about the pivot axis formed by the axis of rotation for the rod-like member 32 so that the arms 34 and 36 can be rotated through a suitable angle as, for example, in excess of 135° and up to 180°. Such means consists of first and second linkage mechanisms 39 provided adjacent each end of the rod-like member 32. Each of the linkage mechanisms includes a bracket 37. Each bracket 37 includes a pair of spaced apart generally triangular plates 41 which are mounted in fixed positions upon the rod-like member 32. The arms 34 and 36 are mounted in a fixed position upon the rod-like member 32 between the plates 41. The plates 41 are secured to the rod-like member 32 in such a manner that the rod-like member is disposed adjacent the apex of the triangular shaped plates 41.

Means is provided for rotating the arms 34 and 36 about the axis of rotation of the rod-like member 32 and consists of a link 42 which is pivotally connected by a pin 43 to one corner of the triangular plates 41. The other end of the link 42 is pivotally connected by a pin 44 to one end of an L-shaped member 46. The other end of the L-shaped member is connected by a pin 48 to a support plate 49 mounted upon the subframe 19. The heel of the L-shaped member is pivotally connected by a pin 51 to the outer extremity of the piston rod 52 of a hydraulic actuator assembly 53 which includes hydraulic cylinder 54. The cylinder 54 is provided with a protrusion 56 which is pivotally connected by a pin 57 to a support plate 58 mounted upon the subframe 19. From the construction thus far described, it can be seen that the linkage mechanism 39 generally underlies the truck bed body 21 and that only the triangularly shaped brackets 37 which are connected to the rod-like member 32 extend outwardly to the rear of the vehicle. The other parts are secured to the subframe and underlie the truck bed body 21. The hydraulic cylinder 54 is connected by suitable piping or tubes (not shown) for supplying hydraulic fluid under pressure to the same under the control of a hydraulic control valve in a manner well known to those skilled in the art.

The reel lifting apparatus includes a spindle bar 61 which is adapted to be inserted through the central hole 63 of a cable reel 62. The reel 62 is conventionally provided with a pair of spaced apart holes 63 which are formed in the spokes or arms 64 extending diametrically of the reel. The outer extremities of the spoke arm 64 are secured to a cylindrical drum 66 and spaced apart inner annular rims 67. Spaced apart annular sideplates 68 are secured to the inner rim 67 and extend outwardly in radial directions to spaced apart annular outer rims 69. The side plates 68 are provided with radially extending reinforcing ribs 71.

As shown in FIG. 4, the spindle bar 61 is held in a predetermined position within the holes 63 of the reel 62 by suitable means such as tapered collars 72 which engage the inner surfaces of the arms or spokes 64 and are held in place by set screws 73. By utilizing such an arrangement, it can be seen that the spindle bar 61 can be of a relatively small size and that the collars 72 can be utilized to accommodate various sized holes in the reels. As is well known to those skilled in the art, the size of the holes in the reels differ with the size of the reels. Thus, one spindle bar can be utilized with reels of various sizes merely by use of the tapered collar 72. The collar 72 will hold the spindle bar 61 in a predetermined axial position with respect to the reel 62 so that it cannot slip back and forth but still can rotate in the holes in the reel.

The outer ends of the lifting arms 34 and 36 are each provided with loading catches 76 and are provided with driving catch assemblies 77 and 78. The loading catch 76 is in the form of tooth-like member 81. As can be seen from FIG. 1, the tooth-like member 81 is secured to the arms 34 and 36 by suitable means such as welding and extends forwardly from the arm at a suitable angle as, for example, an angle of approximately 45°. The tooth-like member 81 in cooperation with the arm forms a recess 82 which is capable of accommodating the outer ends of the spindle extending beyond the sides of the reel 62 and is utilized for loading reels onto the reel carrying structure or frame 23 as hereinafter described.

The catch assembly 77 mounted upon the arm 34 consists of a block 86 which is provided with a U-shaped recess therein that is adapted to receive the spindle bar 61. The block 86 is secured to the arm 34 by suitable means such as welding. A link 89 has one end pivotally mounted upon a bolt 91 carried by a pair of spaced apart projections 92 welded onto the block 86. The link 89 carries a dog 93 which is adapted to loosely overlie the top of the spindle 61 as shown in FIG. 5. Means is provided for adjustably positioning the outer end of the link 89 so as to position the dog 93 and consists of an eyebolt assembly 94 which is carried between a pair of spaced apart projections 96 welded to the front portion of the block 86. The eyebolt assembly 94 consists of a sleeve 97 which is pivotally mounted upon a bolt 98 which is carried by the projections 96. A threaded rod 99 is welded to the sleeve 97 and extends at right angles therefrom. The rod 99 is adapted to seat within a recess or slot 101 provided in the forward extremity of the link 89. A large hexagonal nut 102 is mounted on the upper extremity of the threaded rod 99 and is adapted to engage the upper extremity of the link 89 to adjust the position of the outer extremity of the link 89 with respect to the rod 99. A pair of adjustable jam nuts 103 are also mounted on the threaded rod 99 and are positioned to determine the lowermost position of the outer end of the link 89 so that the dog 93 will not rub against the spindle 61. The jam nuts 103 also make it possible to tightly clamp the outer end of the link 89 in place by the nut 102. By the construction of this catch assembly 77 it can be seen that by loosening the nut 102, the eyebolt assembly 94 can be swung to an out-of-the-way position and the link 89 lifted so that the spindle 61 can be inserted or removed.

The driving catch assembly 78 provided on the arm shaft 36 is shown in detail in FIG. 6. As shown therein, it consists of two spaced-apart plates 106. A block 109 is mounted between U-shaped plates 106 by suitable means such as welding. The block 109 is provided with a U-shaped recess 111 which generally conforms to the configuration of one of the plates 106 and which is adapted to receive one end of the spindle 61 as shown in FIG. 6. The link 112 has one end of the same pivotally mounted upon a bolt 113 carried by the upstanding ends of the U-shaped plates 106. Means is provided for securing the other end of the link 112 in a predetermined position and consists of an eyebolt assembly 114 similar to the eyebolt assembly 94 hereinbefore described.

The eyebolt assembly 114 consists of a sleeve 116 which is pivotally mounted upon a bolt 117 mounted in the outer extremities of the U-shaped plates 106. A threaded rod 118 extends diametrically or at right angles from the sleeve 116 and is adapted to seat in a slot 119 provided in the outer end of the link 112. A pair of adjustable jam nuts 121 and a large nut 122 are provided for securing the outer end of the link to the threaded rod 118 in a predetermined position. As shown in FIG. 6, the link 112 is adapted to engage a generally U-shaped lug 126. This lug 126 is provided with a curved surface 127 on one end and a generally flat planar surface 128 on the other end. The curved surface is adapted to seat within the U-shaped recess and is provided in one of the plates 106 whereas the planar surface 128 is adapted to be engaged by the link 112. The drive lug 126 is formed integral with a spindle bar arm 129. The spindle bar arm is adapted to be secured to the spindle 61 by the spindle 61 seating in a bore 131 in the spindle bar arm 129. Means is provided for securing the spindle bar to the reel through which the spindle bar has been inserted and consists of a pin 136 which is mounted in one end of the spindle bar 129 and which is adapted to engage one side of one of the spokes 64 of the reel so as to drive the reel as the spindle bar arm 129 is driven as hereinafter described. In order to control movement of the reel within a few degrees, the catch mechanism 137 is provided on the other end of this spindle bar arm 129 and consists of a U-shaped bracket 138 which is adapted to fit over one of the arms 64 and then be slid onto another pin 139 carried by the other end of the spindle bar arm 129.

Means is provided for rotating the driving catch assembly 78 for supporting the same upon the arms 36 and 38 and consists of a stub shaft 141 which is fixed to the drive catch assembly 78 so it rotates therewith. The stub shaft 141 is rotatably mounted in a bearing housing 142 which carries a pair of tapered roller bearing assemblies (not shown) that carry the stub shaft 141. The bearing housing 142 is carried by a large end bracket 143. The end bracket 143 is mounted upon the ends of the arms 36 and 38. A large planetary gear housing 144 is secured to the end bracket 143 by suitable means such as cap screws 146. The planetary gear housing 142 carries within the same an in-line planetary gear reducer of a type well known to those skilled in the art. The gear reducer is driven by a large hydraulic motor 147 of a suitable type such as one manufactured by Char-Lynn which is secured to the planetary gear housing 144 by bolts 148.

As shown in FIG. 2, a small windlass or drum 151 can be mounted on the outer extremity of the spindle 61 for a purpose hereinafter described.

A catch mechanism is provided for retaining the reel which has been mounted upon the reel support or reel carrying frame 23. This catch mechanism 156 consists of a block 157 which is provided with a U-shaped recess 158. One end of the block 157 is pivotally mounted on a pin 159 carried by the angle member 24. The block is provided with a rounded surface 161 so that the block can be tilted upwardly at a right angle as shown by broken lines in FIG. 9. As shown in FIG. 9, when a spindle has been advanced to a position adjacent the block 157, the block can be flipped downwardly over the spindle and clamped in place by another pin 162 extending through the block and through the angle member 24 to hold the spindle in place.

Operation and use of the reel lifting apparatus may now be briefly described as follows. Let it be assumed that the truck 12 is empty of reels and it is desired to load one of the reels 62 onto the reel carrying structure or frame 23. When this is the case, the hydraulic actuator 54 is actuated to lower the arms 34 and 36 so that they are substantially in a horizontal position as shown in FIG. 1. Spindle bar 61 is inserted into the reels and collars 72 are mounted on the spindle to hold the spindle bar in a predetermined position with respect to the reel. The end of the spindle bar 61 extends beyond the reel and the reel is rolled into position so that the spindle bar seats within the recess 82 of the tooth-like members 81 carried by the arms 34 and 36. The hydraulic cylinders 54 are then actuated to cause extension of the pistons 52. This causes a force to be applied to the L-shaped member 46 which causes a force to be applied to one corner of the triangular shaped plates 41 to in turn cause the arms 34 and 36 to be raised and to be rotated through an arc as shown in FIG. 1 until the outer extremities of the spindle come into engagement with the angle members 24 of the carrying frame 23. The arms 34 and 36 are rotated still further so that the spindle is freed from the tooth-like members 81. The reel can then be rolled forward on the support frame 23. The catches 156 are moved so they are in the vertical upright position and the spindle bar 61 and the reel 62 carried thereby are rolled until the spindle bar comes into engagement with the block 157. Thereafter, the block 157 can be lowered over the top of the spindle bar and clamped in place by insertion of the pins 162. It can be seen that the reel 62 is in the forwardmost position of the truck bed body 21.

Now let it be assumed that it is desired to load a reel into the catch assemblies 77 and 78 provided on the outer ends of the arms 34 and 36. The hydraulic cylinders 54 are again actuated to lower the arms 34 and 36 so that they are in generally horizontal positions as shown in FIG. 1. Spindle bar 61 is inserted into the next reel 62 and positioned in a predetermined position by the collars 72. The reel 62 is positioned in such a manner that the spindle 61 can be positioned in the catch assemblies 77 and 78. The collar 72 is positioned in such a manner that the spindle 61 seats in the spindle bar arm 129. The spindle bar arm 129 is positioned so that the pin 136 is disposed on one side of one of the spokes 64. Thereafter, the U-shaped bracket 138 is positioned over the arm 64 and is inserted over another pin 139 carried by the other end of the spindle bar arm 129 engaging the opposite sides of one of the spokes 64. The drive lug 126 carried by the spindle bar arm 129 is inserted into the driving catch assembly 78 and is clamped in place by the use of the eye bolt assembly 114 as hereinbefore described. The spindle 61 is also locked in place in the catch assembly 77 by the eye bolt assembly 94 also in a manner hereinbefore described. As soon as this has been accomplished, the cylinders 54 can be actuated to cause raising of the arms 34 and 36 as hereinbefore described to cause the reel 62 to be lifted through an arc as shown in FIG. 1 and to raise the wheel and stowed in the broken-line position shown in FIG. 1 immediately to the rear of the reel 62 which is carried by the reel support frame 23. As can be seen, the last reel 62 carried by the catch assembly 78 and 77 is mounted in a position so that it is relatively close to the rear axles and generally overlies the bed of the truck bed body 21. Even though two large reels are carried by the truck bed body, it can be seen that the weight is well distributed over the truck bed body and is generally forward of the rear wheels 16.

The reel lifting mechanism which has heretofore been described for raising and lowering the reels is capable of causing travel through approximately 180°, although in the embodiment shown travel through only approximately 135° to 145° is required. It should be appreciated that with the lifting equipment the reels can be loaded onto and removed from the reel support frame 23. In addition, reels can be carried in and removed from the catch assembly 77 and 78 provided at the outer ends of the arms 34 and 36.

The operation of the hydraulic cylinders 54 is independent of the in-line drive means which is provided for driving the reel which is mounted in the lifting equipment. In other words, the in-line drive can be operated in any position of the arms 34 and 36, although typically it would be operated when the reel is in the broken-line position as shown in FIG. 1. With such an arrangement, it has been found that it is very possible to provide a 4,000 pound pull at the 42-inch diameter on the reel. The reel can be utilized in conventional cable pulling and cable placing operations. The windlass 151 has been provided to also aid cable pulling and placing operations. The windlass which by way of example has a diameter of 6 inches would apply a pulling force of 30,000 pounds or a pulling force of approximately seven times that of the reel because of its proportionally smaller diameter.

In connection with the foregoing, it can be seen that the lifting equipment also can be utilized for loading and carrying reels. The catch mechanisms which are utilized at the ends of the arms make it possible to accommodate reels of different sizes. This is also made possible by the fact that an in-line drive is provided at the ends of the arms for driving the reel. The clamp or catch mechanism 137 provided at the end of the spindle bar arm 129 serves to control the movement of the cable reel so that it goes with the spindle bar arm 129 and stays generally in synchronism therewith. The catch or clamp mechanism 137 prevents over-running or overtravel by the reel. In other words, the spindle bar arm 129 with its pin 136 and the bracket 138 engaging the spokes 64 permits a few degrees of freedom of movement relative to the spindle bar arm 129. The upper section of the reel lifting mechanism is generally positioned so that it underlies the truck bed body and serves to position the reels so that the major portion of the payload for the vehicle substantially overlies or is ahead of the rear axle of the vehicle. The reel is always positively driven by the in-line drive mechanism located at the ends of the support arm. The reels can be driven in either direction by reversal of the hydraulic motor. When reels are not loaded onto the vehicle, it can be seen that the bed of the truck bed body is free for other uses because the lifting mechanism is generally positioned beneath the truck bed body and does not interfere with the use of the bed space.

What is claimed is:

1. In a reel lifting apparatus, a truck-like vehicle having a wheeled framework, a subframe mounted on said framework, a truck bed body mounted on said subframe and overlying said subframe, said truck bed body having a planar bed surface, an elongate rod-like member, means pivotally mounting said elongate rod-like member on said body so that it extends in a direction at right angles to the longitudinal axis of the vehicle, a pair of arms, means for mounting said pair of arms in spaced apart fixed positions on said rod-like member, means carried by the ends of said arms for receiving and carrying a reel, a plate-like member secured to said rod-like member, an L-shaped member, means pivotally securing one end of said L-shaped member to the subframe, means pivotally connecting the other end of the L-shaped member to the plate-like member at a point offset from the axis of the rod-like member, an actuator underlying the truck bed body and having one end pivotally connected to the subframe and having the other end pivotally connected to the L-shaped member at a point between the ends of the L-shaped member whereby there is imparted to said rod-like member and the arms carried thereby rotational movement in excess of 135°.

2. A lifting apparatus as in claim 1 wherein said arms are capable of pivotal movement through an angle of approximately 180°.

3. A lifting apparatus as in claim 1 together with a reel, a spindle bar adapted to be inserted through the reel and removably mounted on the ends of said arms, motive means carried by the outer end of at least one of said arms, and means coupling said motive means to said spindle bar and the reel carried thereby so that the reel can be positively rotated by the motive means.

4. A lifting apparatus as in claim 1 together with a reel carrying structure mounted upon the framework of the vehicle, said reel carrying structure including a pair of spaced apart parallel angle members, a pair of tooth-like members secured to said arms and extending outwardly therefrom at an angle, a spindle bar adapted to be inserted in through a reel and carried by said tooth-like members whereby as said arms are raised, a reel can be lifted onto the reel carrying structure.

5. A lifting apparatus as in claim 4 wherein said spindle bar of the reel is lowered onto the reel support structure as the arms are rotated about an angle so that the spindle bar is supported by the angle members together with catch means carried by the angle members for retaining the spindle bar in a fixed position on the reel carrying structure.

6. A lifting apparatus as in claim 1 together with a drive mechanism rotatably carried by the outer end of one of said arms, said drive mechanism having a motor and a stub shaft coupled to said motor, a reel, a spindle bar arm having members capable of engaging said reel, a drive dog carried by spindle bar arm and releasable means secured to said stub shaft and adapted to engage said drive lug so as said motor is operated the spindle bar arm will be rotated to cause rotation of the reel.

7. A lifting apparatus as in claim 6 wherein said releasable means of the drive mechanism engaging the drive lug includes a quick release catch mechanism.

8. A lifting apparatus as in claim 7 together with a quick release catch mechanism carried by the other of said arms for engaging said spindle bar.

9. A lifting apparatus as in claim 6 wherein said reel is provided with at least one spoke and wherein said spindle bar is provided with a pin-like member adapted to engage one side of said spoke together with a catch mechanism mounted on the other end of said spindle bar arm for engaging a spoke of said reel so as to limit the freedom of movement of said reel within a small angle with respect to said spindle bar arm.

10. In a reel lifting apparatus, a truck-like vehicle having a wheeled framework, a subframe mounted on said framework, a truck bed body mounted on said subframe and overlying said subframe, said truck bed body having a planar bed surface, an elongate rod-like member, means pivotally mounting said elongate rod-like member on said body so that it extends in a direction at right angles to the longitudinal axis of the vehicle, a pair of arms, means mounting said pair of arms in spaced apart fixed positions on said rod-like member, means underlying the truck bed body for causing rotational movement of said elongate rod-like members to move said arms through a substantial angle, a spindle bar adapted to be inserted through the reel and removably mounted on the ends of said arms, drive means carried by the end of at least one of said arms and means adapted to couple said drive means to said reel to cause rotation of the reel.

11. Lifting equipment as in claim 10 together with a reel, wherein said reel is provided with at least one spoke and wherein said means for causing rotation of said reel includes a spindle bar arm, means carried by the spindle bar arm for engaging at least one of said spokes of said reel so that as spindle bar arm is rotated said reel is rotated, a drive lug carried by the spindle bar arm, quick release catch means engaging said drive lug and coupled to said drive means.

12. A lifting apparatus as in claim 11 together with quick release catch means mounted on the other of said arms for engaging the spindle.

13. Lifting equipment as in claim 11 wherein said means engaging said spoke of said reel includes a pin engaging one side of said one spoke and a catch engaging a spoke to prevent more than limited rotational travel of said reel with respect to said spindle bar arm.

14. A lifting apparatus as in claim 10 wherein said drive means includes a hydraulic motor and a planetary in-line gear reducing drive and means coupling said motor to said quick release catch mechanism.

* * * * *